(12) United States Patent
Crocker (10) Patent No.: US 8,357,292 B2
(45) Date of Patent: Jan. 22, 2013

(54) WATER TREATMENT SYSTEM FOR SURFACE CLEANING APPARATUS

(76) Inventor: James P. Crocker, Stuart, FL (US)

(*) Notice: Subject to any disclaimer, the term of this patent is extended or adjusted under 35 U.S.C. 154(b) by 445 days.

(21) Appl. No.: 12/693,516

(22) Filed: Jan. 26, 2010

(65) Prior Publication Data

US 2010/0200514 A1 Aug. 12, 2010

Related U.S. Application Data (60) Provisional application No. 61/147,158, filed on Jan. 26, 2009.

(51) Int. Cl.
*B01D 33/04* (2006.01)
*B01D 37/03* (2006.01)
*B01D 21/28* (2006.01)
*B01D 21/01* (2006.01)
*B01D 21/02* (2006.01)

(52) U.S. Cl. ......... 210/85; 210/96.1; 210/101; 210/106; 210/205; 210/207; 210/208; 210/209; 210/241; 210/251; 210/297; 210/298; 210/299; 210/305; 210/319; 210/391; 210/400; 210/409; 210/416.1; 210/521; 210/526; 210/783; 210/738; 210/802; 210/806

(58) Field of Classification Search .................. None
See application file for complete search history.

(56) References Cited

U.S. PATENT DOCUMENTS

| | | | |
|---|---|---|---|
| 1,789,425 A * | 1/1931 | Cabrera | 204/276 |
| 2,074,623 A | 3/1936 | Schroth | |
| 2,267,086 A * | 12/1941 | Donohue | 210/779 |
| 3,026,966 A * | 3/1962 | Asklof | 95/29 |
| 3,151,348 A | 10/1964 | Maasberg | |
| 3,166,773 A | 1/1965 | Wyczalek | |
| 3,489,679 A | 1/1970 | Davidson et al. | |
| 3,532,070 A | 10/1970 | Lamarque | |
| 3,540,073 A | 11/1970 | Issenmann et al. | |
| 3,619,632 A | 11/1971 | Labombarde | |
| 3,639,936 A | 2/1972 | Ashton | |
| 3,658,589 A | 4/1972 | Shaddock | |
| 3,694,033 A | 9/1972 | Rowley et al. | |
| 3,701,426 A | 10/1972 | Wetzel | |
| 3,753,777 A | 8/1973 | Thomsen et al. | |
| 3,787,916 A | 1/1974 | Akagi et al. | |
| 3,812,379 A | 5/1974 | Kaufman et al. | |

(Continued)

OTHER PUBLICATIONS

Specialty Chemicals/Coagulants & Flocculants, Ecologix Environmental Systems, www.dcologixsystems.com/ch_coag_floc.php.

(Continued)

*Primary Examiner* — Robert James Popovics
(74) *Attorney, Agent, or Firm* — McHale & Slavin, P.A.

(57) ABSTRACT

The present invention relates generally to an environmentally sensitive mobile cleaning system, and more specifically relates to a closed loop water recirculation system for high or ultra-high pressure mobile cleaning apparatus. The system includes a water tank sized to contain an established volume of fluid sufficient to circulate through the system, a pump to pressure the fluid to a cleaning head, a vacuum system to return the contaminated fluid to the system, and a filter means to remove the contaminants from the fluid so that clean fluid can be reintroduced to the cleaning head. The method comprises the steps of increasing the pressure of a fixed volume of fluid in a closed-loop system, jetting or blasting the surface with the pressurized fluid, vacuuming the blasted fluid into the system, and removing the contaminants from the fluid.

17 Claims, 7 Drawing Sheets

U.S. PATENT DOCUMENTS

| | | | |
|---|---|---|---|
| 3,900,969 A | 8/1975 | Diehn | |
| 3,959,010 A | 5/1976 | Thompson et al. | |
| 3,977,128 A | 8/1976 | Goff | |
| 4,007,026 A | 2/1977 | Groh | |
| 4,158,248 A | 6/1979 | Palmer | |
| 4,158,575 A | 6/1979 | Townsend | |
| 4,199,837 A | 4/1980 | Fisco, Jr. | |
| 4,227,893 A | 10/1980 | Shaddock | |
| 4,290,820 A | 9/1981 | Swisher, Jr. et al. | |
| 4,336,671 A | 6/1982 | Nelson | |
| 4,340,488 A * | 7/1982 | Toth et al. | 210/705 |
| 4,376,358 A | 3/1983 | Shelton | |
| 4,377,924 A | 3/1983 | Bergh | |
| 4,509,963 A | 4/1985 | Jackson | |
| 4,578,840 A | 4/1986 | Pausch | |
| 4,753,052 A | 6/1988 | Dickson | |
| 4,819,676 A | 4/1989 | Blehert et al. | |
| 4,839,061 A | 6/1989 | Manchak Jr. et al. | |
| 4,935,984 A | 6/1990 | Bryant et al. | |
| 5,002,595 A | 3/1991 | Kehr | |
| 5,041,165 A | 8/1991 | Urbani | |
| 5,060,334 A | 10/1991 | Strauser et al. | |
| 5,076,919 A | 12/1991 | Francisco, Jr. | |
| 5,108,471 A | 4/1992 | Poborsky | |
| 5,224,236 A | 7/1993 | Sallquist | |
| 5,236,278 A | 8/1993 | Dickson | |
| 5,589,080 A | 12/1996 | Cho et al. | |
| H0001660 H | 7/1997 | Herman et al. | |
| 5,704,989 A | 1/1998 | Page | |
| 5,708,989 A | 1/1998 | Ellis | |
| 5,826,460 A | 10/1998 | Soncina et al. | |
| 5,961,847 A * | 10/1999 | Creps et al. | 210/783 |
| 5,965,020 A | 10/1999 | Pierson | |
| 5,979,012 A | 11/1999 | Fritz | |
| 6,042,726 A | 3/2000 | Anderson | |
| 6,073,720 A | 6/2000 | Vanderlinden | |
| 6,082,630 A | 7/2000 | Bohrer | |
| 6,113,800 A | 9/2000 | Hopkins et al. | |
| 6,129,094 A | 10/2000 | Moll et al. | |
| 6,221,258 B1 * | 4/2001 | Feke et al. | 210/748.05 |
| 6,302,967 B1 | 10/2001 | Rohrbacher et al. | |
| 6,328,165 B1 * | 12/2001 | Baker et al. | 209/235 |
| 6,358,406 B1 | 3/2002 | Hirs | |
| 6,393,944 B1 | 5/2002 | Soncina et al. | |
| 6,402,822 B1 | 6/2002 | Najm | |
| 6,495,031 B1 | 12/2002 | Bratten | |
| 6,653,265 B2 | 11/2003 | Rossi et al. | |
| 6,685,830 B2 * | 2/2004 | Hartleitner et al. | 210/262 |
| 6,749,666 B2 * | 6/2004 | Meegan, Jr. | 95/29 |
| 6,797,158 B2 * | 9/2004 | Feke et al. | 210/97 |
| 6,835,315 B2 | 12/2004 | Fox et al. | |
| 6,896,742 B2 | 5/2005 | Geyer et al. | |
| 7,029,579 B2 | 4/2006 | Tapp | |
| 7,029,580 B2 * | 4/2006 | Suzuki et al. | 210/199 |
| 7,150,779 B2 * | 12/2006 | Meegan, Jr. | 95/29 |
| 7,204,365 B2 | 4/2007 | Behymer et al. | |
| 7,216,397 B1 | 5/2007 | Tanner | |
| 7,255,116 B2 | 8/2007 | Crocker | |
| 7,364,652 B2 * | 4/2008 | Middleton | 210/158 |
| 7,625,588 B2 | 12/2009 | Barker et al. | |
| 7,674,158 B2 * | 3/2010 | Crocker | 451/73 |
| 7,798,158 B2 | 9/2010 | Crocker | |
| 7,824,547 B2 * | 11/2010 | Reynders et al. | 210/171 |
| 8,147,689 B1 * | 4/2012 | Cogar | 210/173 |
| 2002/0036173 A1 * | 3/2002 | Feke et al. | 210/748 |
| 2002/0139722 A1 * | 10/2002 | Bratten | 209/272 |
| 2003/0205242 A1 | 11/2003 | Gerber et al. | |
| 2004/0050805 A1 * | 3/2004 | Hartleitner et al. | 210/800 |
| 2004/0237247 A1 | 12/2004 | Nowak et al. | |
| 2004/0262242 A1 * | 12/2004 | Middleton | 210/783 |
| 2005/0067355 A1 * | 3/2005 | Suzuki et al. | 210/723 |
| 2006/0000491 A1 | 1/2006 | Crocker | |
| 2006/0185689 A1 | 8/2006 | Crocker | |
| 2007/0051672 A1 * | 3/2007 | Reynders et al. | 210/167.09 |
| 2007/0169797 A1 | 7/2007 | Crocker | |
| 2007/0204889 A1 | 9/2007 | Crocker | |
| 2007/0207711 A1 | 9/2007 | Crocker | |
| 2008/0066781 A1 | 3/2008 | Crocker | |
| 2009/0241999 A1 | 10/2009 | Crocker | |
| 2009/0242003 A1 | 10/2009 | Crocker | |
| 2010/0167339 A1 * | 7/2010 | Clayton et al. | 435/41 |
| 2010/0200514 A1 * | 8/2010 | Crocker | 210/741 |

OTHER PUBLICATIONS

Potable and Process Water Chemical Applications, www.coynechemical.com/environmental, 2000 George S. Coyne Chemical Co., Inc.

Johnson, Committee report: Characterization of inorganic coagulant/polymer blends using refractive index and specific gravity measurements, CAT.INIST, 2004, vol. 96, pp. 170-173, American Water Works Association, Denver, CO.

* cited by examiner

WATER TREATMENT SYSTEM FOR SURFACE CLEANING APPARATUS

CROSS REFERENCE TO RELATED APPLICATIONS

This application is a continuation in part and claims the priority of U.S. Patent Application No. 61/147,158, entitled "Mobile Water Recirculation System For Surface Cleaning Apparatus", filed Jan. 26, 2009, the contents of which are incorporated herein in their entirety. This application is related to U.S. Pat. No. 7,255,116, entitled "Stripe Removal System", issued Aug. 14, 2007, U.S. patent application Ser. No. 11/340,738, entitled, "Transportable Holding Tank For Stripe Removal System", filed Jan. 26, 2006, and U.S. patent application Ser. No. 11/340,104, entitled "Mobile Mark Removal System", filed Jan. 26, 2006, the contents of which are incorporated herein by reference.

FIELD OF INVENTION

The present invention generally relates to water treatment systems, and more particularly to a closed loop water treatment system that is particularly suited for surface cleaning apparatus.

BACKGROUND INFORMATION

Water treatment describes those processes used to make water more acceptable for a desired end-use. These can include use as drinking water, industrial processes, medical and many other uses. The goal of all water treatment processes is to remove existing contaminants in the water, or reduce the concentration of such contaminants so the water becomes fit for its desired end-use. One such use can be returning water that has been used back into the natural environment without adverse ecological impact.

The processes that have been suggested for use in treating water for solids separation include physical processes such as settling and filtration, and chemical processes such as disinfection and coagulation.

Biological processes have also been employed in the treatment of water, and these processes may include, for example, aerated lagoons, activated sludge or slow sand filters.

Surface cleaning apparatus such as pressure washers are useful for cleaning a variety of objects. Such devices require a clean supply of water for proper operation, but create wastewater by entraining solids from the cleaned surface into the used source water. Although there are many types of pressure washing systems, a typical system utilizes an engine that powers a pump. The inlet side of the pump is connected to a low pressure water source such as a tank or a municipal water supply, while the high pressure side of the pump is connected to a high pressure hose and wand for controlling the flow of high pressure water generated by the pump. The high pressure water is directed at a surface to dislodge dirt, paint and the like, and the water is generally allowed to drain into the storm sewer.

Ultra-high pressure washers, supplying more than 25,000 P.S.I. are also known. These systems include a large engine, typically diesel, which operates a large multi-cylinder pump to generate high volumes of water at ultra-high pressures. The ultra-high pressure water is directed through piping and/or hoses to various types of blast heads suitable for controlling the flow and direction of the ultra-high pressure water. One particular use for ultra-high pressure water devices is the removal of stripes or other markings from road surfaces. When polymers such as paint or plastic are used for roadway marking, the surface of the pavement is penetrated from ⅛-⅜ inch; whereby water blasting is the only known method of removing the stripe material from below the surface without removing a portion of the roadway surface. Ultra-high pressure water washers are also utilized for removing paint from ships, cleaning industrial facilities, removing graffiti, removing rubber from aircraft runways and demolition.

One problem associated with both low and ultra-high pressure water cleaning equipment is maintaining an adequate supply of clean water for continuous operation of the system. Dirty or contaminated water causes numerous problems with water cleaning equipment such as excessive pump wear, clogged filters, nozzles, screens and the like. Because cleaning often needs to take place away from municipal water supplies, water is often transported to the cleaning site. Because the water cleaning equipment requires large volumes of water to be effective, additional equipment is needed to haul in tanks of water. Alternatively, cleaning must be stopped so that additional water may be obtained.

Recovery and disposal of the water is another problem facing water cleaning equipment users. Demolition or even the mere cleaning of surfaces results in the water becoming contaminated with dirt and debris. This problem is particularly exacerbated with ultra high pressure water cleaning equipment which breaks dirt and debris up into particles small enough to remain suspended within the water indefinitely. Therefore, the contaminated water should be properly recovered and thereafter cleaned or contained before it can be disposed of.

Industrial systems that utilize filter belts are also known to be used for solid/liquid separation processes, particularly the dewatering of sludges in the chemical industry, mining and water treatment. The process of filtration is primarily obtained by passing a pair of filtering cloths and belts through a system of rollers. The feed sludge to be dewatered is introduced from a hopper between two filter cloths (supported by perforated belts) which pass through a convoluted arrangement of rollers. As the belts are fed through the rollers, water is squeezed out of the sludge. When the belts pass through the final pair of rollers in the process, the filter cloths are separated and the filter cake is scraped off into a suitable container. Water sprays are typically utilized to clean the filter cloth before it is reused. The water spray is reclaimed to be reprocessed or diverted to a drain for disposal. However, in these systems it is typically the solid filter cake that the user is interested in recovering and not the water that was carrying the solid particles, and thus the water typically remains dirty and is discarded to the drain.

Therefore, there is a need in the art for a water recirculation system that is suitable for applications such as high pressure or ultra-high pressure water cleaning equipment. The water recirculation system should provide a predetermined amount of clean water to start the cleaning operation. The water recirculation system should recover the dirty and contaminated water expelled during the cleaning process for removal of dirt and debris so that the water can be recirculated through the pressure cleaning equipment. The water recirculation system should be efficient enough to recirculate a sufficient volume of water for continuous operation of the water cleaning system. The water recirculation system should retain the dirt and debris for proper disposal. The water recirculation system should be compact enough to fit on a mobile frame that may also contain the high or ultra-high pressure water cleaning equipment.

There is also a need in the art for a water filtration system that is suitable for municipal, industrial and private uses. The water filtration system should utilize a continuous filter belt in combination with a settling tank for water containing a coagulant. The filter belt should be submerged within the settling tank a predetermined distance to control the hydrostatic head pressure utilized to push the debris containing water through the filter belt to limit the adhesion of the particles to the filter belt so that vacuum can be utilized to clean the filter belt for continuous use. The filter belt should be sized and the head pressure selected to provide a desired volume of cleaned water. The water can then be used as is or supplied to additional equipment or processes for further cleaning.

Thus, the present invention provides a water recirculation system for stationary or mobile applications and is particularly suited for surface cleaning apparatus and the like which overcomes the disadvantages of the prior art systems.

SUMMARY OF THE INVENTION

The present invention relates generally to an environmentally sensitive mobile cleaning system, and more specifically relates to a closed loop water recirculation system for high or ultra-high pressure mobile cleaning apparatus. The water recirculation system works in combination with a mobile pressure cleaning apparatus for cleaning surfaces while minimizing water usage and containing contaminants before they enter a storm water drain system. The system includes a water tank sized to contain an established volume of fluid sufficient to circulate through the system, a pump to pressure the fluid to a cleaning head, a vacuum system to return the contaminated fluid to the system, and a filter means to remove the contaminants from the fluid so that clean fluid can be reintroduced to the cleaning head. The method comprises the steps of increasing the pressure of a fixed volume of fluid in a closed-loop system, jetting or blasting the surface with the pressurized fluid, vacuuming the blasted fluid into the system, and removing the contaminants from the fluid.

Accordingly, it is an objective of the present invention to provide an environmentally sensitive cleaning system.

It is a further objective of the present invention to provide a mobile water recirculation system for surface cleaning apparatus.

It is yet a further objective of the present invention to provide a mobile water recirculation system for surface cleaning apparatus that reduces particulate size within the recirculated water to less than 1 micron.

It is another objective of the instant invention to provide a novel sediment tank arrangement.

It is yet another objective of the instant invention to provide a mobile water recirculation system for surface cleaning apparatus that includes a coagulant injection system.

It is still yet another objective of the instant invention to provide a mobile water recirculation system for surface cleaning apparatus that includes a continuous belt type filter.

It is yet a further objective of the instant invention to provide a method of continuously cleaning water to remove suspended solids therefrom.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 1:
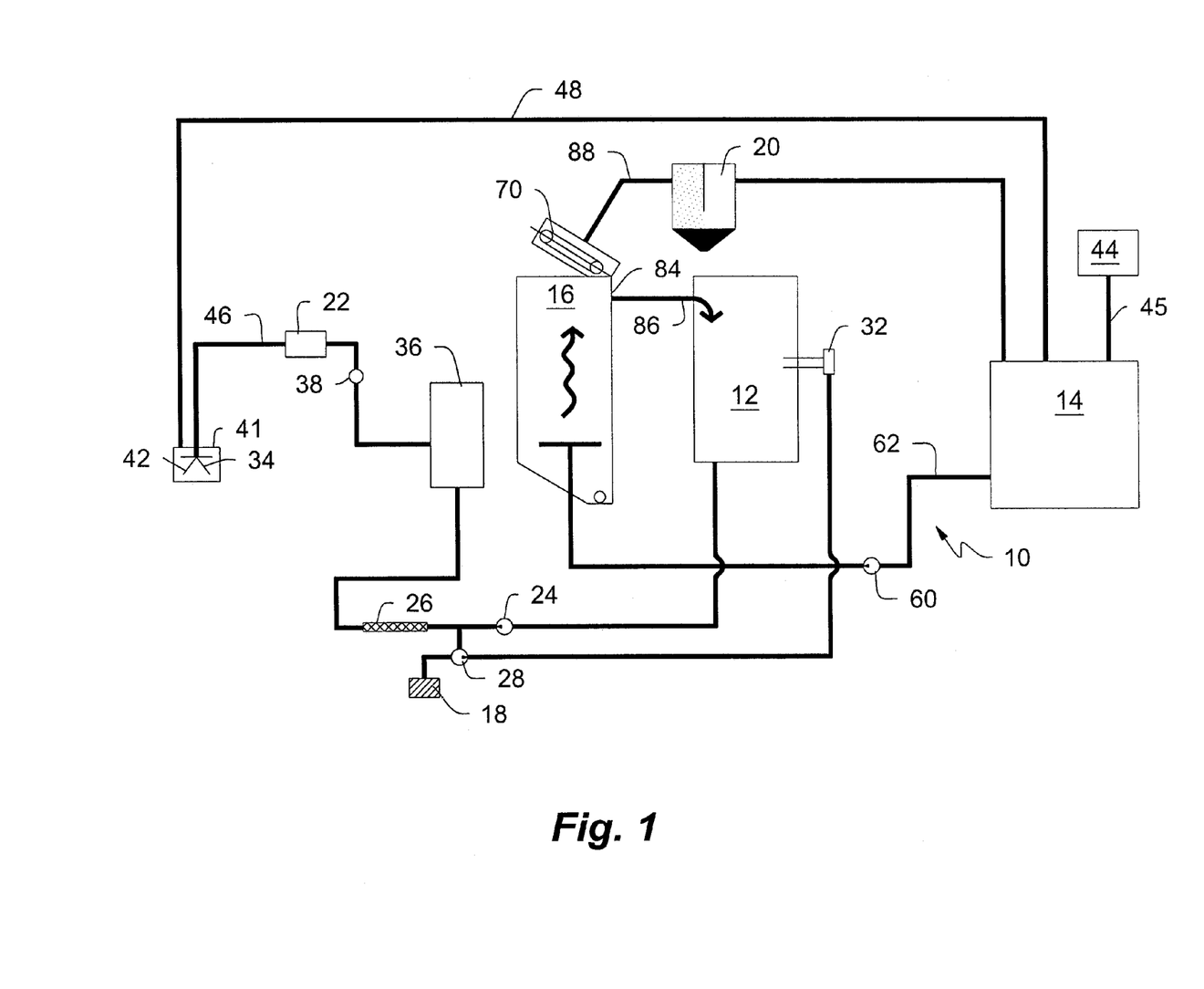
FIG. 1 is a block diagram that illustrates one embodiment of the mobile water recirculation system for surface cleaning apparatus of the instant invention.
Figure 5:
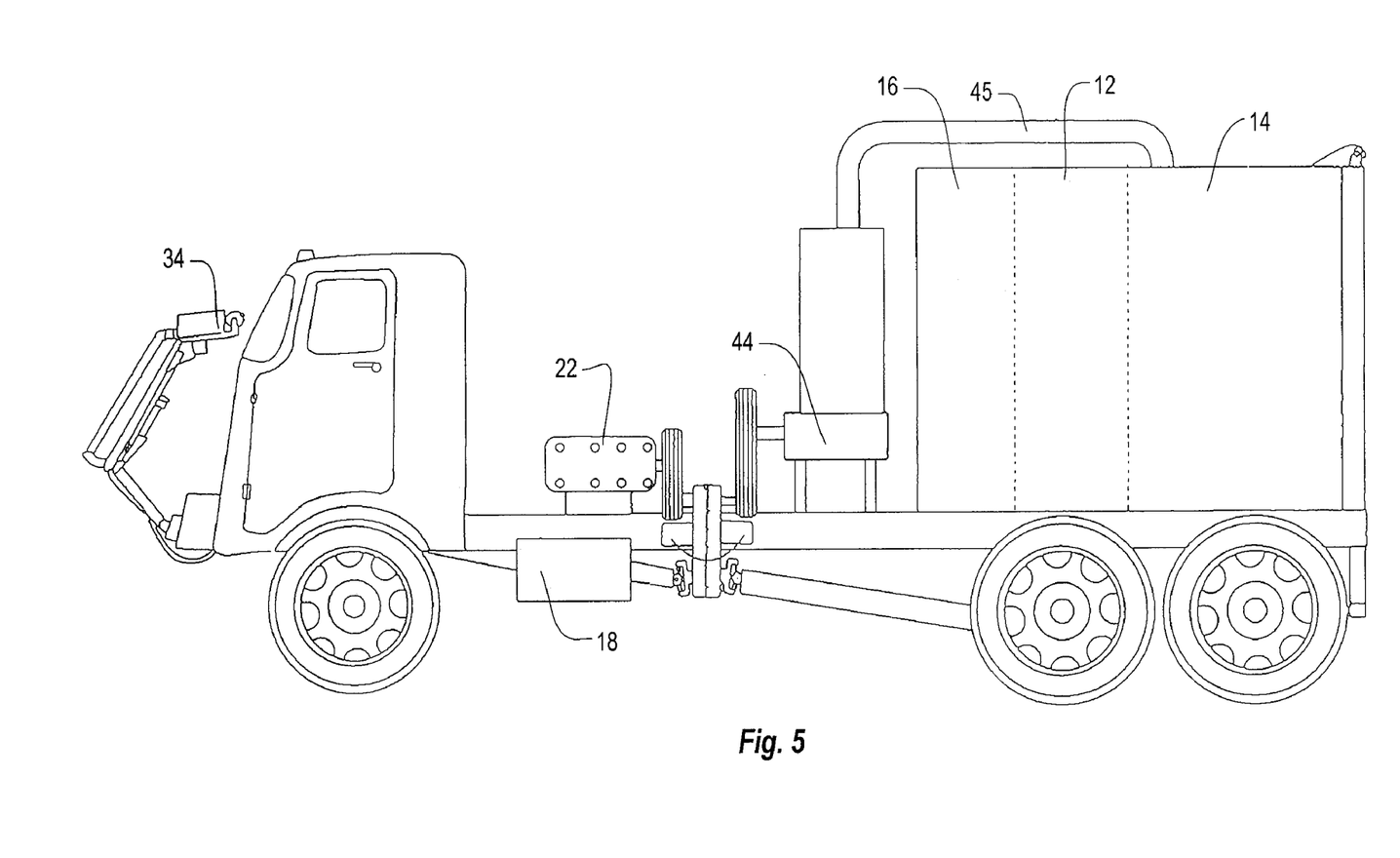
FIG. 5 shows the mobile water recirculation system mounted on a mobile truck frame.
Figure 6:
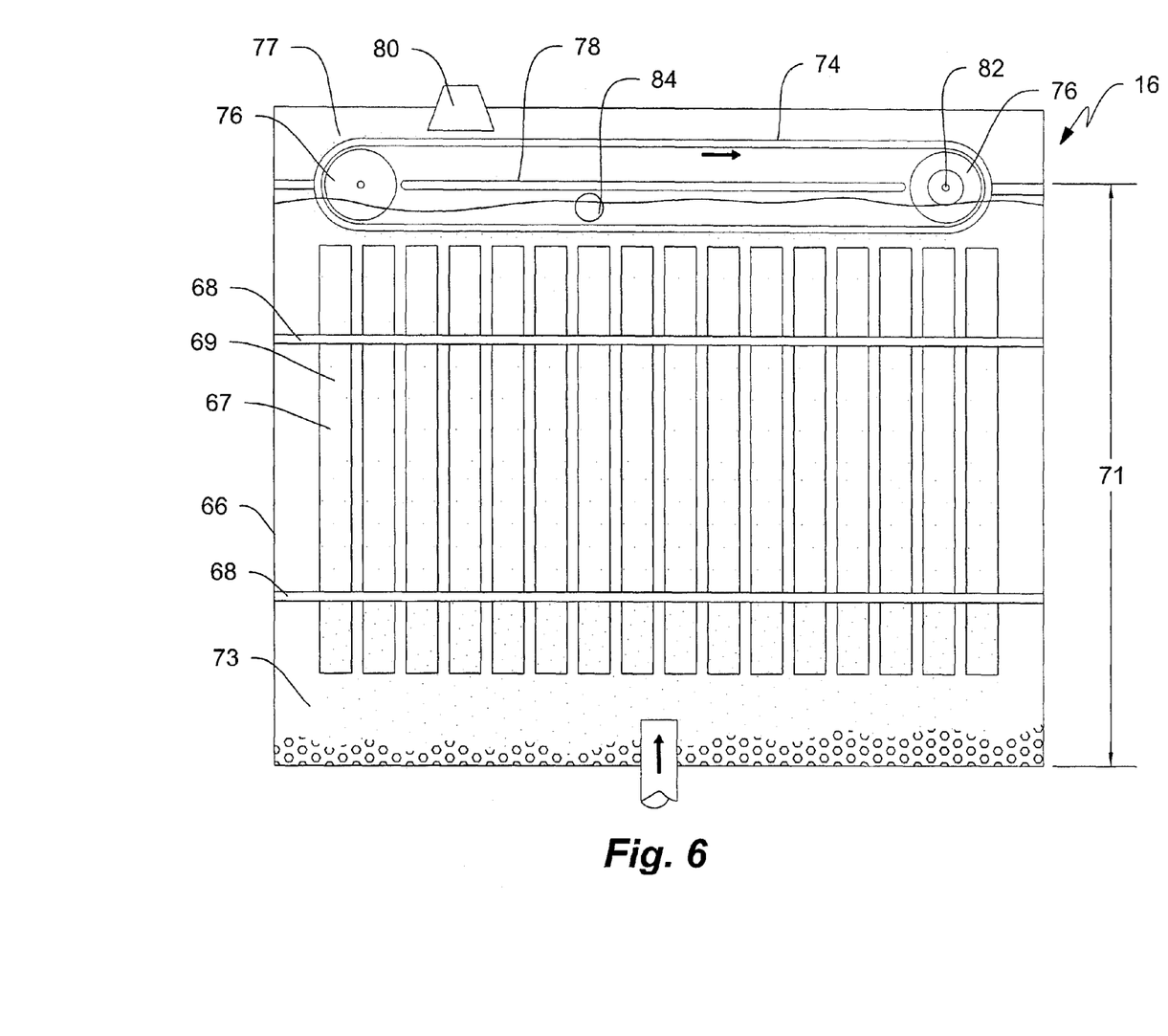
FIG. 6 is a section view of the sediment tank illustrating separation of the solids suspended within the water.

Referring generally to FIGS. 1 and 5, a mobile water recirculation system 10 for surface cleaning apparatus is illustrated. The preferred embodiment of the water recirculation system generally includes a water supply tank 12, a vacuum tank 14, a sediment tank 16, a coagulant tank 18, a muck tank 20, an ultra-high pressure pump 22, and a blast head 34. Clean water is stored in the water tank 12. Preferably, the water tank 12 has about a 2,700 gallon capacity. The water tank 12 functions not only to store substantially non-contaminated water, but also to provide a constant source of water to the ultra-high pressure water pump 22. Water drains from the water tank through water port 40, entering supply line 30 which extends to charge pump 24. Charge pump 24 forces the water through a mixing tube 26 so that coagulant from the injection pump 28 is thoroughly mixed with the water. The injection pump injects coagulant and/or flocculent into supply line 30 based on the measured amount of coagulant in the water as measured by the coagulant tester 32. It should be noted that the coagulant may be injected into the system as the water enters the water tank 12 or vacuum tank without departing from the scope of the invention. Fluid exiting the mixing tube is routed through a 5 micron filter 36 and thereafter through a 1 micron filter 38. The and 5 micron filters are preferably cartridge type filters that allow for easy maintenance. Water exiting the 1 micron filter is routed to the ultra-high pressure pump 22. The ultra-high pressure pump preferably pumps about 12 gallons of fluid per minute at a pressure of about 40,000 pounds per square inch (PSI). Fluid discharges from the ultra-high pressure pump via high pressure line 46 to the blast head 34 which includes a plurality of nozzles 42. From the nozzles 42, the fluid impinges upon a surface entraining particles within the fluid. It should be noted that while the water recirculation system is particularly suited for use with pressure cleaning systems, it could be utilized with many municipal, industrial, and private water cleaning operations without departing from the scope of the invention. Vacuum pump 44 provides a negative pressure to vacuum tank 14 via line 45. Vacuum line 48 extends between vacuum tank 14 and shroud 41 that extends around blast head 34. The shroud contains the water as it impinges upon the surface so that the vacuum can draw the solid containing dirty water into the vacuum tank 14.

Figure 2A:
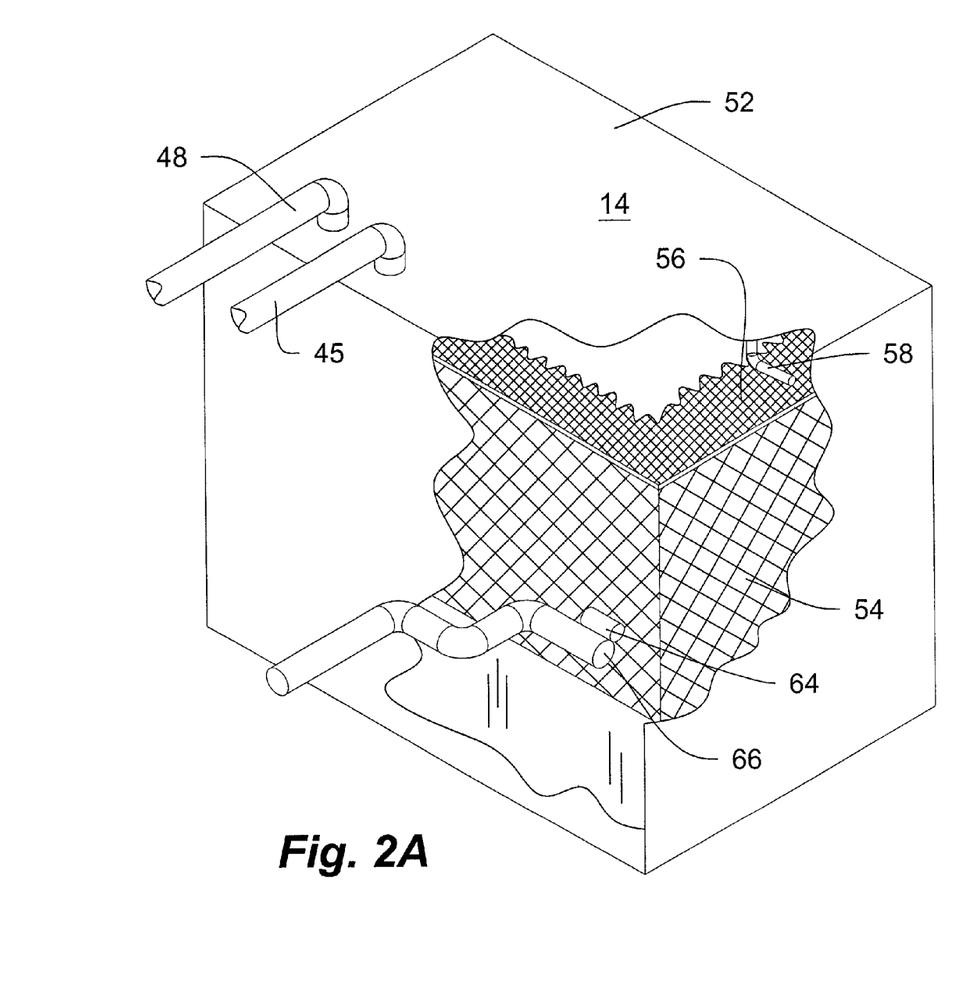
FIG. 2A is a top perspective view illustrating one embodiment of the vacuum tank illustrated in FIG. 1.
Figure 2B:
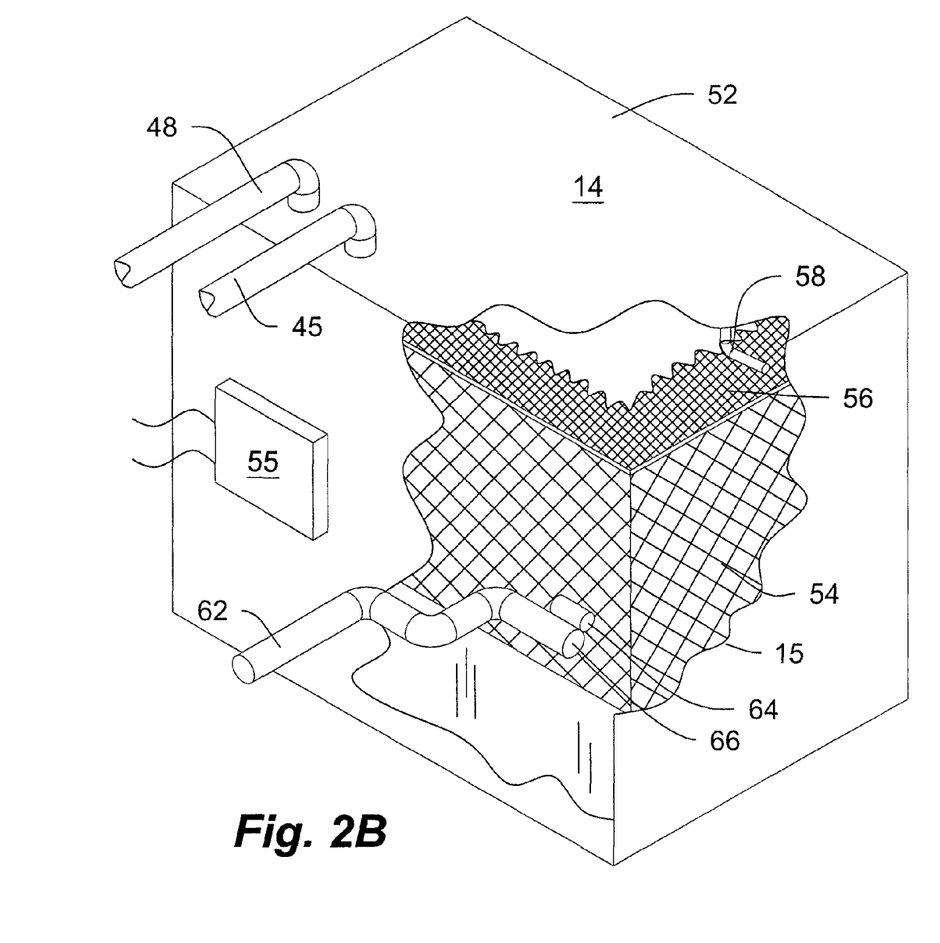
FIG. 2B is a top perspective view illustrating one embodiment of the vacuum tank illustrated in FIG. 1.
Figure 3:
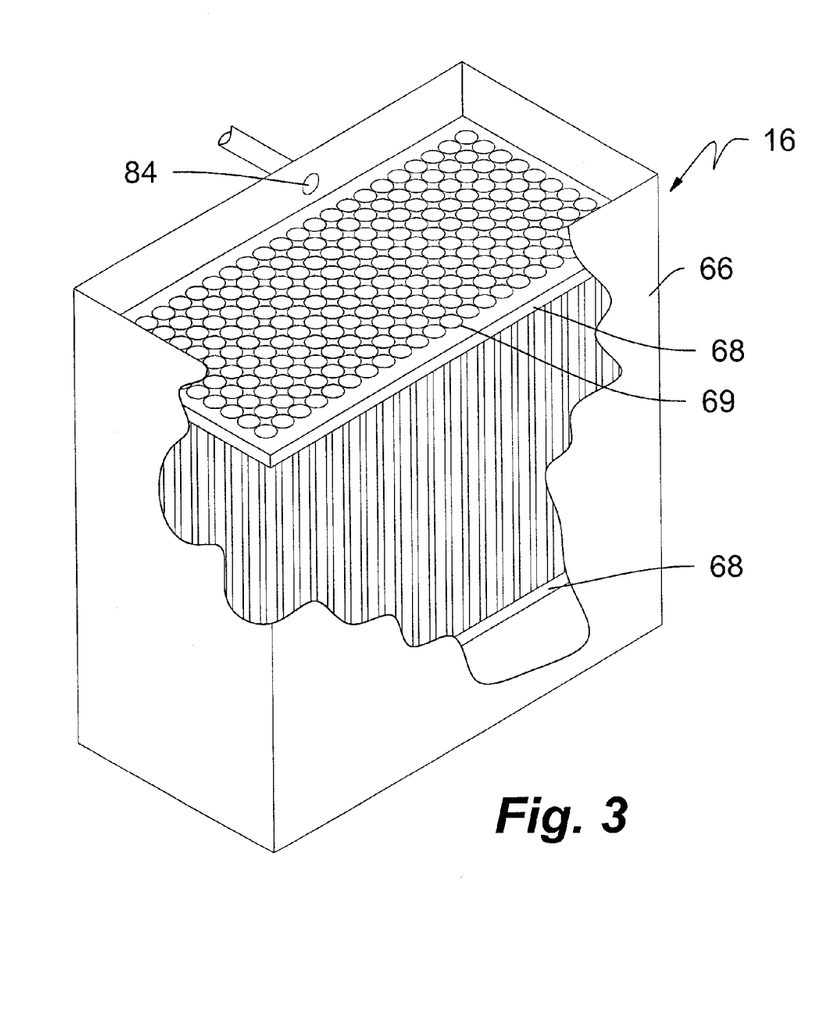
FIG. 3 is a top perspective view of one embodiment of the sediment tank illustrated in FIG. 1.

Referring to FIGS. 1, 2A and 2B, the vacuum tank is illustrated. The vacuum tank 14 includes an outer wall having sufficient thickness to withstand the vacuum created by vacuum pump 44 which is preferably a roots blower type. Contained within the vacuum tank is a basket constructed from an expanded metal and supported to be spaced away from the outer wall 52 on all sides. A filter bag 56 is hung from the outer wall 52 on hooks 58 so that the top of the bag is open to accept the dirty water flowing into the vacuum tank through vacuum line 48. The dirty water flows through the filter bag 56 to the area between the basket 54 and the outer wall 52, leaving a large portion of the entrained solids within the filter bag 56. As the vacuum tank 14 fills with water, transfer pump 60 moves water from the vacuum tank to the sediment tank 16 via transfer line 62. Transfer line 62 includes a float assembly 64 at about a distal end thereof. The float assembly maintains the aperture 66 below the upper surface of the dirty water and above the bottom of the tank as it has been found that a layer of debris floats on the upper surface of the water while the larger solids settle to the bottom of the vacuum tank. FIG. 2B illustrates an alternative embodiment of the vacuum tank illustrated in FIG. 2A. In this embodiment, the vacuum tank 14 includes at least one magnet 55 secured to one of the tank walls. In a most preferred embodiment, the magnet 55 is an electro-magnet, secured to the tank so that the magnetic flux created by the magnet contacts the water flowing into the vacuum tank 14. In this manner, magnetic particles or particles including a magnetic coagulant and/or flocculent are attracted to the magnet thereby removing them from the water. Turning off or scraping the magnet allows these particles to be removed from the tank when the vacuum tank is emptied.

Figure 4:
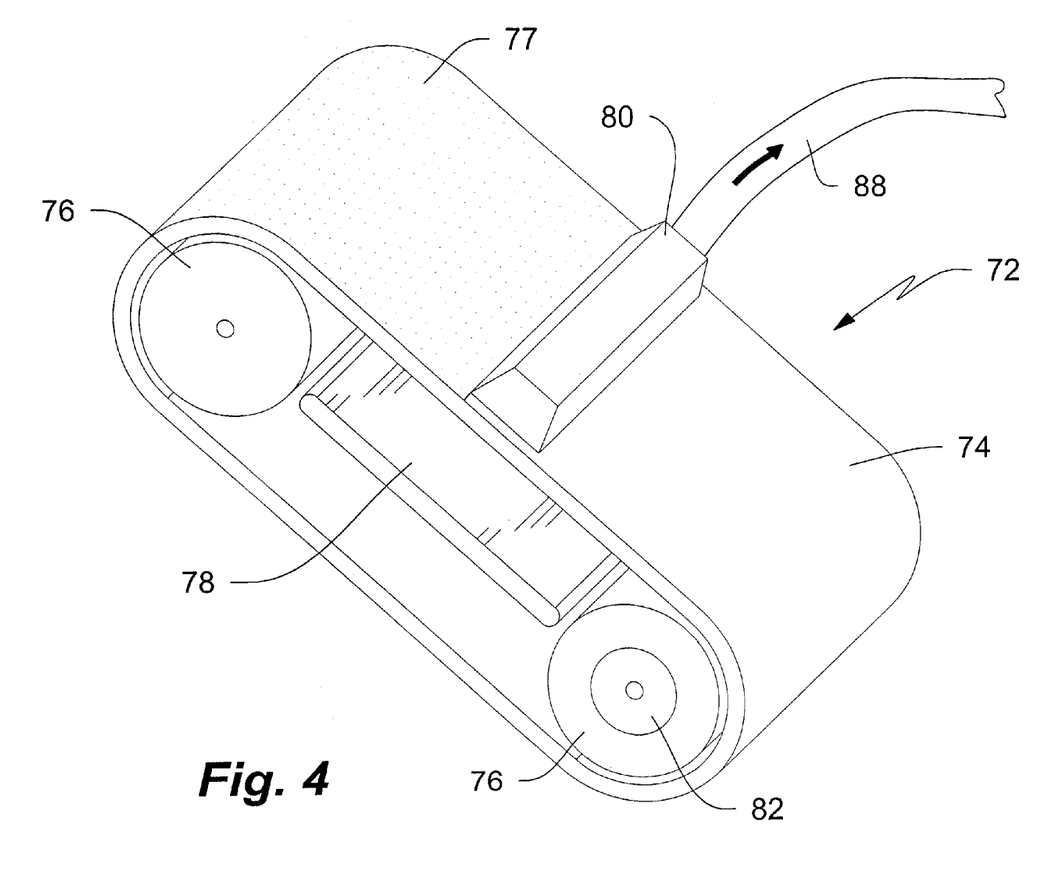
FIG. 4 is a top perspective view of one embodiment of the continuous belt filter.

Referring to FIGS. 1, 3, 4 and 5, the sediment tank 16 is illustrated. The sediment tank includes an outer shell 66. Within the outer shell 66 are one or more, and preferably a pair of horizontal baffles 68. The horizontal baffles include a plurality of apertures sized to cooperate with a vertical baffle system illustrated herein as sediment tubes 69. The sediment tubes 69 are preferably about 2 inches in diameter, and in a most preferred embodiment there are about 200 sediment tubes suspended between the horizontal baffles 68 within the sediment tank 16. The sediment tubes 69 are sized to utilize vibrations from the mobile frame to cause the liquid contained therein to agitate suitably to allow the coagulant to function and bind the suspended solids 67 within the fluid 71 so that they drop to the bottom of the sediment tank faster than the water level rises through the tank. Tubes that are too small don't allow adequate agitation, while tubes that are too large provide too much agitation and prevent settling of the suspended solids. It should be noted that other vertically oriented baffles sized and shaped to utilize vibration to bind suspended solids within a liquid may be utilized without departing from the scope of the invention. It should also be noted that other means of applying free or forced vibration to the sediment tank may be utilized without departing from the scope of the invention. Such vibrations may be random or periodic and may be generated by one or more devices well known on the art. The outer shell 66 and the transfer pump 60 are preferably sized so that the water rises within the tank at about 2 inches per minute. It has been found through experimentation that a coagulant such as aluminum chlorhydrate will bind the suspended solids 77 together and they will fall through the tubes at about 4 inches per minute. In this manner, the fluid, e.g. water, retains less solids as it moves vertically through the sediment tank. Pivotally mounted within the lid 70 of the sediment tank 16 is a continuous filter 72 (FIG. 4). The continuous filter includes a belt 74 of filter material such as, but not limited to, cloth, a pair of rollers 76, a divider plate 78 and a vacuum head 80. The belt 74 is sized to extend around the rollers 76. At least one of the rollers includes a roller motor 82 sized to rotate the roller at about 6 inches per minute. Rollers having internal motors are well known in the art of conveyors and may include frequency generators or stepper motors to control the rotational speed of the roller. Fluid flowing upward through the sediment tank flows through the bottom portion of the filter belt depositing any remaining solids 77 on the surface thereof. The cleaned water is allowed to flow to the fresh water tank 12 for reuse. The divider plate 78 separates the lower (first) and upper (second) portions of the belt so that the upper portion of the belt is subjected to vacuum through the vacuum head to clean the upper portion of the filter belt. The vacuum head is preferably sized to cover the width of the belt. The filter belt is sized and positioned into the water column 71 so as to regulate the head pressure provided by the fluid flowing upward through the sediment tank. In a most preferred embodiment, the filter belt is a 1 micron cloth belt submerged about six inches into the water. This construction allows the user to precisely establish the pressure, per square unit of measure that is applied to the filter belt to force the liquid through the filter. In this manner, lowering the filter raises the head pressure and raising the filter toward the surface of the water lowers the head pressure. At a flow rate of about 12 gallons per minute, about 4,600 square inches of 1 micron filter belt have been found to be sufficient, so that about 5 inches of mercury vacuum are sufficient to clean the filter belt. The filter belt is sized to allow the desirable amount of water to flow therethrough at a head pressure that allows the solid particles 77 to be lifted from the filter belt 74 with vacuum after use. Altering the size of the mesh of the filter belt 74 may require repositioning of the filter belt in the column of water 71 to maintain the desired characteristics. The fluid then exits the sediment tank 16 through aperture 84 and flows through conduit 86 to the water supply tank 12. As the dirty filter belt travels around the rollers, the vacuum head 80 uses vacuum from the vacuum tank 14, supplied via conduit 88, to remove the solid debris from the surface of the filter belt. A muck tank 20 may be provided within the vacuum conduit to aggregate the solid material vacuumed off of the filter belt. The tanks are all preferably provided with openings, hatches, doors or the like suitable to allow cleaning of the system as required. It has been found using this system and method that the coagulated solids are substantially only lightly adhered to the filter belt and are not embedded therein. This allows the vacuum to easily pull the solids off of the filter belt so that it can be used in continuous operation.

It should noted that while aluminum chlorhydrate is the preferred coagulant, other coagulants such as but not limited to aluminum chloride, aluminum sulfate, ferric chloride, ferric sulfate, poly aluminum chloride, clays, sodium aluminate, ULTRA-FLOC, WESTCHLOR, inorganic/polymer blends and suitable combinations thereof, may be utilized without departing from the scope of the invention. It should also be noted that these coagulants may include or be combined to carry iron to create a magnetic flocculent or coagulant.

What is claimed is:
1. A water treatment system comprising:
a sediment tank for containing a supply of water containing solid particles inside, said supply of water defining a water column, said sediment tank having a water inlet positioned in a lower portion thereof and a water outlet at an upper portion thereof;
a vertically oriented baffle system positioned within said sediment tank so that said water containing solid par- ticles must pass through said baffles, a top surface of said baffles positioned below a top surface of said water column;

a filter belt extending around a pair of rollers, a first portion of said filter belt positioned a predetermined distance below said top surface of said water column defining a head pressure for causing said water to flow through said filter belt to said water outlet adhering said solid particles to a surface of said filter belt, a second portion of filter belt positioned above said top surface of said column of water, said outlet being located between said first and second belt portions such that only water that has passed through said filter belt exits through said outlet;

a means of vibrating said vertically oriented baffle system to cause said solid particles in said water to collide and agglomerate;

whereby said agglomerated particles fall through said vertical baffle system faster than said supply of water rises through said sediment tank.

2. The water treatment system of claim 1 including a coagulant tank containing a supply of coagulant and a coagulant injection pump for injecting coagulant from said coagulant tank into said water prior to entering said sediment tank water inlet.

3. The water treatment system of claim 2 including a coagulant tester, said coagulant tester being constructed and arranged to measure the volume of coagulant contained within said water and cause said coagulant injection pump to inject coagulant into said water based on said measurement.

4. The water treatment system of claim 3 including a mixing tube constructed and arranged to mix said coagulant with said water.

5. The water treatment system of claim 3 including a vacuum pump fluidly connected to a vacuum head, said vacuum head positioned adjacent said second portion of said filter belt for removing solids from a surface of said filter belt.

6. The water treatment system of claim 2 including a vacuum tank fluidly connected to said sediment tank water inlet and an inlet of said vacuum pump, said vacuum tank constructed and arranged for receiving and holding a volume of solid containing water.

7. The water treatment system of claim 6 further including a filter bag suspended within said vacuum tank so that the top of said filter bag is open to accept said dirty water flowing into said vacuum tank, said filter bag extracting a portion of said solids within said water.

8. The water treatment system of claim 7 including a water supply tank in fluid communication with said water outlet of said sediment tank for receiving water that has had said solid particles substantially removed therefrom.

9. The water treatment system of claim 8 including a high pressure pump in fluid communication with said water supply tank and at least one nozzle, said high pressure pump constructed and arranged to draw water from said water supply tank, pressurize said water and expel said water through said at least one nozzle for impingement against a surface.

10. The water treatment system of claim 9 wherein said high pressure pump is an ultra-high pressure pump capable of delivering at least 25,000 pounds per square inch of pressure to said at least one nozzle.

11. The water treatment system of claim 9 including a shroud extending around and over said at least one nozzle, said shroud in fluid communication with said vacuum tank whereby said shroud contains the water as it impinges upon said surface so that the vacuum can draw the solid containing water into said vacuum tank.

12. The water treatment system of claim 11 wherein said water treatment system is mounted on a frame having wheels so that said water treatment system is mobile.

13. The water treatment system of claim 12 wherein said means of vibrating said vertically oriented baffle system to cause said solid particles in said water to collide and agglomerate is an internal combustion engine secured to said frame.

14. The water treatment system of claim 13 wherein said internal combustion engine is constructed and arranged to provide motive force to said wheels for transport of said water treatment system.

15. The water treatment system of claim 1 wherein said vertical baffle system includes a plurality of sediment tubes arranged in a generally parallel arrangement with respect to each other, said sediment tubes being sized to cause the water and solids contained therein to agitate suitably to bind said solids together causing them to sink to the bottom of said sediment tank faster than said water rises though said sediment tank.

16. The water treatment system of claim 15 wherein said sediment tubes are about two inches in diameter.

17. The water treatment system of claim 1 wherein said filter belt is constructed of a cloth material.

* * * * *